July 1, 1930.　　　　B. N. SEARCY　　　　1,769,468
MARKER
Filed Aug. 3, 1928
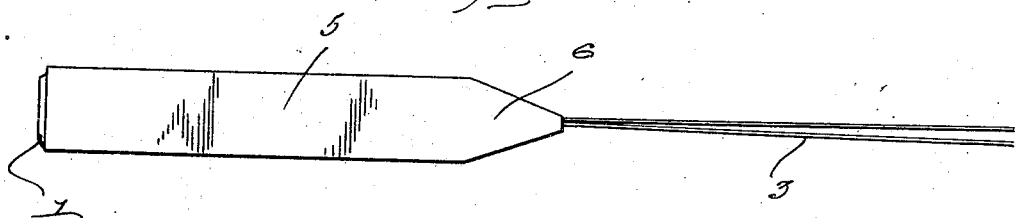
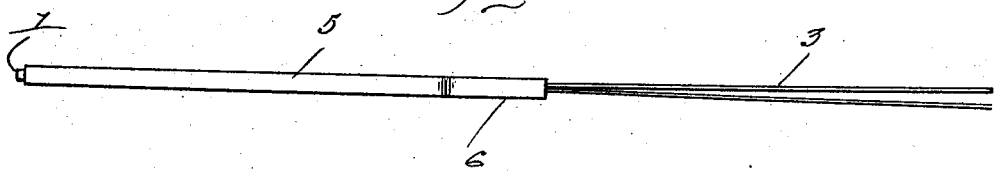
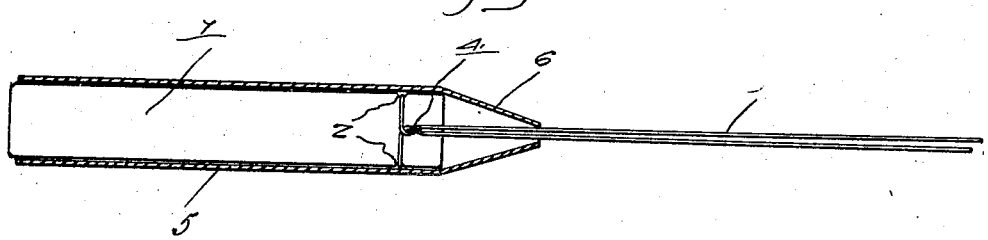
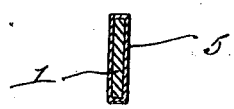
Inventor
B. N. Searcy
By Clarence A. O'Brien
Attorney Patented July 1, 1930

1,769,468

UNITED STATES PATENT OFFICE

BENJAMIN N. SEARCY, OF RISING SUN, INDIANA

MARKER

Application filed August 3, 1928. Serial No. 297,308.

The present invention relates to improvements in markers and aims particularly to provide a marker especially useful for marking plants and shrubbery, but which nevertheless can be employed for sundry other purposes.

The prime object of the invention is to provide a marker consisting of a tag element and a protecting sleeve for said tag, whereby the markings on the tags will be protected from inclement weather by the sleeve, thus maintaining the intelligence thereon legible for a considerable length of time.

Another important object is to provide a marker, capable of being manufactured at a very nominal cost and which will be far more practical for outdoor use, than the exposed markers now generally used.

After reading the following specification and claim, other important objects and advantages of the invention will become apparent.

In the drawings:—

Figure 1 represents the device in side elevation.

Fig. 2 is an edge elevation of the device.

Fig. 3 is a longitudinal sectional view thru the sleeve and showing the disposition of the tag elements therein and Fig. 4 is a transverse sectional view of the device.

Referring to the drawings, wherein like numerals designate like parts, an elongated block 1 of the desired thickness and width may be constructed of any cheap material, such as wood. Adjacent one end of the block notches 2 are formed at the opposite edges of the blocks, for receiving a tie strand 3 of ductile material, which is looped around the block 1 and twisted at 4.

An elongated flat hollow member 5 is adapted to serve as a shield for the tag 1, and is preferably constructed of some rust resisting material. The shield 5 is open at both ends, and is tapered at one end portion 6, thus reducing the size of the opening, at this end of the shield relative to the opening at the opposite end thereof.

Obviously by inserting the tag element 1 into the shield 5, the strand 3 may be drawn to the small opening at the constricted end of the shield, whereas the inserted end of the tag elements 1 abut with the interior of the tapered portion 6 to limit the inward movement thereof.

It is preferable the tag be of a sufficient length to permit the butt end thereof to project a slight distance exteriorly of the shield 5 so that the same may be easily gripped for removing the tag from the shield 5. In using this device for plants and trees, the strand 3 may be of flexible or ductile material, to permit the connection thereof to a limb of the plant.

The device will naturally assume a vertical position, which will result in the maintenance of the shield 5 over the tag 1.

Having thus described my invention, what I claim as new is:—

A marker of the character described comprising a sleeve opening at one end and being constructed at its opposite end to provide a relatively small opening, a tag removably disposed within said sleeve, said tag being of a length so that one end of the same will project from the open end of the sleeve, when the tag is inserted therein, said tag having notches at one end, a strand of ductile material engaged around the notched end of the tag and within the said notches, and twisted and disposed with its end portions extending through the constricted opening.

In testimony whereof I affix my signature.

BENJAMIN N. SEARCY.